(12) United States Patent
Ryan et al.

(10) Patent No.: US 9,292,170 B2
(45) Date of Patent: Mar. 22, 2016

(54) UNIFIED PRESENTATION OF SCATTERED MESSAGE DATA

(75) Inventors: Corinne M. Ryan, Westford, MA (US); Ruthie D. Lyle, Durham, NC (US); Doris L. Jones, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 1413 days.

(21) Appl. No.: 11/567,952

(22) Filed: Dec. 7, 2006

(65) Prior Publication Data
US 2008/0141168 A1    Jun. 12, 2008

(51) Int. Cl.
*G06F 15/16* (2006.01)
*G06F 3/0482* (2013.01)
*H04L 12/58* (2006.01)
*G06F 3/0481* (2013.01)
*G06Q 10/10* (2012.01)

(52) U.S. Cl.
CPC .......... *G06F 3/0482* (2013.01); *G06F 3/04817* (2013.01); *G06Q 10/107* (2013.01); *H04L 51/22* (2013.01); *H04L 51/34* (2013.01)

(58) Field of Classification Search
USPC ................. 709/217, 218, 219, 230, 231, 232, 709/204–207; 715/205, 207, 208, 752, 808
See application file for complete search history.

(56) References Cited

U.S. PATENT DOCUMENTS

| | | | |
|---|---|---|---|
| 6,670,974 B1 | 12/2003 | McKnight et al. | |
| 6,963,904 B2 * | 11/2005 | Yong | 709/207 |
| 7,421,690 B2 * | 9/2008 | Forstall et al. | 718/100 |
| 7,475,109 B1 * | 1/2009 | Fletcher et al. | 709/204 |
| 7,523,412 B2 * | 4/2009 | Jones et al. | 715/787 |
| 7,552,178 B2 * | 6/2009 | Chen et al. | 709/206 |
| 9,026,597 B1 * | 5/2015 | Emigh et al. | 709/206 |
| 2002/0042838 A1 * | 4/2002 | Tabayoyon et al. | 709/237 |
| 2003/0177190 A1 * | 9/2003 | Moody et al. | 709/206 |
| 2004/0110491 A1 * | 6/2004 | Ozaki | 455/412.1 |
| 2004/0249890 A1 | 12/2004 | Fellenstein et al. | |
| 2005/0166154 A1 | 7/2005 | Wilson et al. | |
| 2005/0234850 A1 * | 10/2005 | Buchheit et al. | 707/1 |
| 2005/0268237 A1 | 12/2005 | Crane et al. | |
| 2006/0010213 A1 * | 1/2006 | Mehta | 709/206 |
| 2006/0041626 A1 * | 2/2006 | Chen et al. | 709/206 |
| 2006/0143274 A1 * | 6/2006 | Schulz et al. | 709/206 |
| 2007/0027955 A1 * | 2/2007 | Voss et al. | 709/206 |

(Continued)

OTHER PUBLICATIONS

Merriam-Webster Online Dictionary, definition of "any", captured Apr. 24, 2009, p. 1.*

*Primary Examiner* — Joshua Joo
(74) *Attorney, Agent, or Firm* — Steven M. Greenberg, Esq.; CRGO Law

(57) ABSTRACT

Embodiments of the present invention address deficiencies of the art in respect to e-mail processing and provide a novel and non-obvious method, system and computer program product for a unified presentation of scattered e-mail data. In one embodiment of the invention, a unified presentation of scattered e-mail data method can include selecting an e-mail in an e-mail list of an e-mail client, locating scattered data for the selected e-mail, and presenting the scattered data in a pop-up window proximate to the selected e-mail. In one aspect of the embodiment, selecting an e-mail in an e-mail list of an e-mail client can include selecting an icon adjacent to an e-mail in an e-mail list of an e-mail client. In another aspect of the embodiment, selecting an e-mail in an e-mail list of an e-mail client can include mousing over an icon adjacent to an e-mail in an e-mail list of an e-mail client.

9 Claims, 2 Drawing Sheets

(56) References Cited

U.S. PATENT DOCUMENTS

| | | | |
|---|---|---|---|
| 2007/0061486 A1* | 3/2007 | Trinh et al. | 709/246 |
| 2007/0157107 A1* | 7/2007 | Bishop | 715/771 |
| 2008/0005247 A9* | 1/2008 | Khoo | 709/206 |
| 2008/0046518 A1* | 2/2008 | Tonnison et al. | 709/206 |
| 2008/0104177 A1* | 5/2008 | Keohane et al. | 709/206 |
| 2008/0320417 A1* | 12/2008 | Begley et al. | 715/822 |

* cited by examiner

110

E-mail Client

| New | Open | Delete | Reply | Reply All | Forward | Move |

Received From          Received On          Size          Subject

130A
👤 John Doe          ✉          04/07/2006   09:08AM   5,948   Re: Meeting

130B
👤 Victor Vector      ✉→

Forwarded on 04/08/2006 at 3:15PM
To: Johnny Johnson
-----------------------------------------
Clarence Clearance
Replied to on 04/08/2006 at 3:50PM
To: Wille Mays Hays
Cc: Rickie Vaughn
-----------------------------------------
👤 Roger Roger       ←✉
               130A
Forwarded on 04/10/2006 at 9:20AM
To: Ted Underhill
Bcc: Hawley Smoot 120                                                                                    140

E-mail Client [Sent Items]

| New | Open | Delete | Reply | Reply All | Forward | Move |

Sent To          Received On          Size          Subject

👤 John Doe          04/07/2006   09:08AM   5,948   Re: Meeting

👤 Victor Vector     04/07/2006   07:31AM   4,313   Re: Payroll

Clarence Clearance

Return Receipt requested on 04/08/2006
-----------------------------------------
130C
👤 Roger Roger    [R]  To: June Cleaver received 04/10/2006 04:10PM
To: Wally Beaver not yet received
To: Dennis Menace received 04/11/2006 11:40AM 120                                                                    150

FIG. 1B

UNIFIED PRESENTATION OF SCATTERED MESSAGE DATA

BACKGROUND OF THE INVENTION

1. Field of the Invention

The present invention relates to the field of electronic messaging and more particularly to processing meta-data for electronic messages in a messaging client.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications, save for voice telephony.

Conventional e-mail clients provide functionality not only for composing new e-mails and reading received e-mails, but also for replying to a received e-mail and for forwarding a received e-mail. When replying to a received e-mail, one can reply only to the sender, or to the sender and all recipients. Notably, when replying to a received e-mail, the received e-mail will be stored in one folder—generally in the inbox, whereas the reply will be stored in a different folder—generally the sent mail folder. The only data linking the two e-mails ordinarily that is visible to the user will be a subject line for the e-mails. Notwithstanding, most conventional e-mail clients provide a visual cue adjacent to a received e-mail indicating that a reply has been processed for the received e-mail.

Conventional e-mail clients further provide a facility for automating a return receipt when a recipient opens an associated e-mail. The return receipt also can be in the form of an e-mail sent automatically on behalf of the recipient of the associated e-mail when opened. As in the case of a reply e-mail, in the return receipt context, the originally transmitted e-mail will be stored in the sent mail folder while the received return receipt e-mail will be stored in a separate folder. Again, the only linkage between the originally transmitted e-mail and the return receipt visible to the user will be the subject line. To the extent that the sender often omits a subject or often uses the same subject, it can be very difficult to locate a return receipt for a transmitted message and vice versa.

BRIEF SUMMARY OF THE INVENTION

Embodiments of the present invention address deficiencies of the art in respect to e-mail processing and provide a novel and non-obvious method, system and computer program product for a unified presentation of scattered e-mail data. In one embodiment of the invention, a unified presentation of scattered e-mail data method can include selecting an e-mail in an e-mail list of an e-mail client, locating scattered data for the selected e-mail, and presenting the scattered data in a pop-up window proximate to the selected e-mail. In one aspect of the embodiment, selecting an e-mail in an e-mail list of an e-mail client can include selecting an icon adjacent to an e-mail in an e-mail list of an e-mail client. In another aspect of the embodiment, selecting an e-mail in an e-mail list of an e-mail client can include mousing over an icon adjacent to an e-mail in an e-mail list of an e-mail client.

Notably, locating scattered data for the selected e-mail can include locating references to e-mails and corresponding recipient and transmission date and time information for the e-mails, each related by reply in a related e-mail table. Similarly, locating scattered data for the selected e-mail can include locating references to e-mails and corresponding recipient and transmission date and time information for the e-mails, each related by forwarding in a related e-mail. As yet another example, locating scattered data for the selected e-mail can include locating references to e-mails and corresponding recipient and transmission date and time information for the e-mails, each related by return receipt requested in a related e-mail In another embodiment of the invention, an e-mail data processing system configured for unified presentation of scattered e-mail data can be provided. The system can include a mail server, a mail store of e-mails processed in the mail-server, and scattered message data unification logic. The logic can include program code enabled to select an e-mail in an e-mail list of an e-mail client coupled to the mail server, to locate scattered data for the selected e-mail, and to present the scattered data in a pop-up window or hover text proximate to the selected e-mail. The system further can include a related e-mail table including scattered data records, each record being associated with a particular e-mail, each record further comprising a set of references to e-mails related by reply, forward or return receipt requested, and corresponding date and recipient information.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIGS. 1A and 1B, taken together, are a pictorial illustration of an e-mail client user interface configured for the unified presentation of scattered e-mail data;

DETAILED DESCRIPTION OF THE INVENTION

Embodiments of the present invention provide a method, system and computer program product for the unified presentation of scattered e-mail data. In accordance with an embodiment of the present invention, scattered e-mail data can be associated with different e-mail messages in an e-mail system. The scattered e-mail data can include a listing of e-mails associated with a particular e-mail by way of a reply or forward, or by return receipt requested. A unified presentation control, such as an icon or decorator, can be displayed in association with an e-mail listed within an e-mail client, responsive to the activation of which a display can be provided with the scattered e-mail data for the associated e-mail in the list. In this way, an end user need not scour different folders in the e-mail client in order to locate the scattered e-mail data. Rather, the scattered e-mail data can be presented within a single display in a unified way.

In illustration, FIGS. 1A and 1B, taken together, are a pictorial illustration of an e-mail client user interface configured for the unified presentation of scattered e-mail data. Considering first FIG. 1A, an e-mail client 110 is shown to include a listing of e-mails 120. Selected ones of the e-mails can include an associated reply-to icon 130A indicating that the e-mail has been replied to, or an associated forwarded icon 130B indicating that the e-mail has been forwarded to another recipient. Both the reply-to icon 130A and the forwarded icon 130B can be activated to detect a mouse-over event. In response to a mouse-over event, scattered data for the corresponding e-mail can be rendered in a pop-up window 140. In this regard, the pop-up window 140 can present a chronological listing of scattered data including when the corresponding e-mail had been replied to, or forwarded, to whom and at what date and time.

In FIG. 1B, again an e-mail client 110 is shown to include a listing of sent e-mails 120. Selected ones of the e-mails can an associated return receipt icon 130C indicating that a return receipt has been requested for one or more recipients of the sent e-mail. The return receipt icon 130C can be activated to detect a mouse-over event. In response to a mouse-over event, scattered data for the corresponding e-mail can be rendered in a pop-up window 150. As shown in FIG. 1B, the pop-up window 150 can present a listing of scattered data including when the return receipt had been requested for the e-mail, and which of the recipients of the e-mail have provided a return receipt and when.

Figure 2:
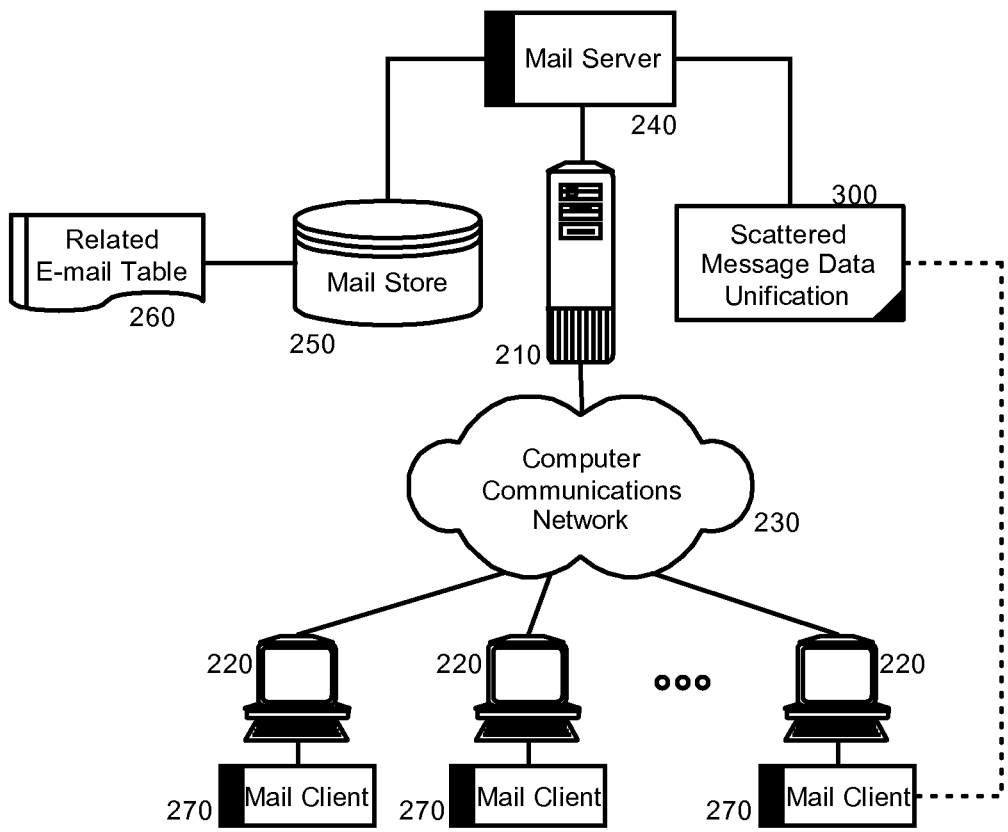
FIG. 2 is a schematic illustration of an e-mail data processing system configured for the unified presentation of scattered e-mail data; and, FIG. 3 is a flow chart illustrating a process for the unified presentation of scattered e-mail data.

In further illustration, FIG. 2 is a schematic illustration of an e-mail data processing system configured for the unified presentation of scattered e-mail data. The system can include a host computing platform 210 supporting the operation of a mail server 240. The host computing platform 210 can be communicatively coupled to one or more computing clients 220 over computer communications network 230 so as to permit the computing clients 220 to communicate with one another by way of e-mail. To that end, the mail server 240 can be configured to process inbound and outbound e-mails over the computer communications network 230 between the different computing clients 220. The computing clients 220 can utilize the mail server 240 to send and receive e-mails amongst one another, or a mail client 270 coupled to each of the computing clients 220 can support the composition, receipt and management of e-mails in lieu of the mail server 240.

A mail store 250 can be coupled to the mail server 240. The mail store 250 can be configured to store e-mails received and transmitted through the mail server 240. To the extent that different ones of the e-mails can be replies to a particular e-mail, or forwards of a particular e-mail, or return receipts requested for a particular e-mail, references to the different ones of the e-mails can be associated with the particular e-mail in a related e-mail table 260 coupled to the mail store 250 as scattered data. Consequently, program code for scattered message data unification logic 300 can be enabled to look up scattered data in the e-mail table 260 for a selected e-mail and present the scattered data in a popup window.

Figure 3:
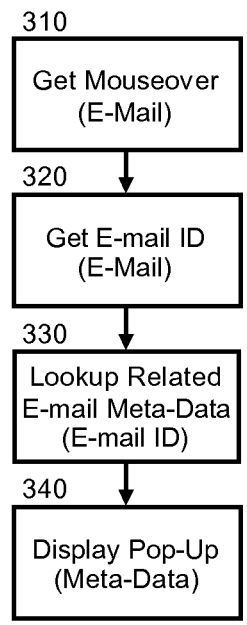

In further illustration of the operation of the scattered message data unification logic 300, FIG. 3 is a flow chart illustrating a process for the unified presentation of scattered e-mail data. Beginning in block 310, a mouse-over event can be detected in association with an e-mail in an e-mail list, such as in connection with a decorator for an e-mail or an icon positioned proximate to the e-mail. In block 320, an identifier can be retrieved for the e-mail and used in block 330 to look up related e-mail meta data (scattered data) including references to e-mails that are replies, forwards or return receipts for the e-mail. Thereafter, in block 340 the meta-data can be presented in a visual pop-up proximate to the e-mail in the e-mail client.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A unified presentation of scattered e-mail data method comprising:

selecting an e-mail in an e-mail list of an e-mail client executing in memory by a processor of a computing client;

locating scattered data for the selected e-mail in a related e-mail table comprising locating references to e-mails related to the selected e-mail and corresponding recipient and transmission date and time information for the e-mails in the related e-mail table, each of the e-mails related by an e-mail handling operation in the related e-mail table, the related e-mail table comprising a plurality of scattered data records, each scattered data record being associated with a particular e-mail, each scattered data record further comprising a set of references to one or more of the e-mails in a mail store of e-mails related to the particular e-mail by reply, by forward, by return receipt requested and by corresponding date and recipient information, for each of the one or more of the e-mails; and, presenting a chronological listing of the scattered data in a pop-up window in the e-mail client.

2. The method of claim 1, wherein selecting the e-mail in the e-mail list of the e-mail client, comprises selecting an icon adjacent to the e-mail in the e-mail list of the e-mail client.

3. The method of claim 1, wherein selecting the e-mail in the e-mail list of the e-mail client, comprises mousing over an icon adjacent to the e-mail in the e-mail list of the e-mail client.

4. The method of claim 1, wherein the e-mail message handling operation for each of the e-mails in the related e-mail table related to the selected e-mail is one of a reply to the selected e-mail message, a forward of the selected e-mail message, and a return receipt requested for the selected e-mail message.

5. An e-mail data processing system configured for unified presentation of scattered e-mail data, the system comprising:
a mail server, the mail server comprising a processor and memory;
a mail store of e-mails processed by the processor of the mail-server; and,
scattered message data unification logic comprising program code enabled to select an e-mail in an e-mail list of an e-mail client coupled to the mail server, locate scattered data for the selected e-mail in a related e-mail table comprising locating references to e-mails related to the selected e-mail and corresponding recipient and transmission date and time information for the e-mails in the related e-mail table, each of the e-mails related by an e-mail handling operation in the related e-mail table, the related e-mail table comprising a plurality of scattered data records, each scattered data record being associated with a particular e-mail, each scattered data record further comprising a set of references to one or more of the e-mails in the mail store of e-mails related to the particular e-mail by reply, by forward, by return receipt requested and by corresponding date and recipient information, for each of the one or more of the e-mails, and present a chronological listing of the scattered data in a pop-up window in the e-mail client.

6. A computer program product comprising a non-transitory computer readable storage medium having stored thereon computer usable program code for a unified presentation of scattered e-mail data, the computer usable program code, when executed on a computer system, causing the computer system to perform the operations of:
selecting an e-mail in an e-mail list of an e-mail client;
locating scattered data for the selected e-mail in a related e-mail table comprising locating references to e-mails related to the selected e-mail and corresponding recipient and transmission date and time information for the e-mails in the related e-mail table, each of the e-mails related by an e-mail handling operation in the related e-mail table, the related e-mail table comprising a plurality of scattered data records, each scattered data record being associated with a particular e-mail, each scattered data record further comprising a set of references to one or more of the e-mails in a mail store of e-mails related to the particular e-mail by reply, by forward, by return receipt requested and by corresponding date and recipient information, for each of the one or more of the e-mails; and,
presenting a chronological listing of the scattered data in a pop-up window in the e-mail client.

7. The computer program product of claim 6, wherein selecting the e-mail in the e-mail list of the e-mail client, comprises selecting an icon adjacent to the e-mail in the e-mail list of the e-mail client.

8. The computer program product of claim 6, wherein selecting the e-mail in the e-mail list of the e-mail client, comprises mousing over an icon adjacent to the e-mail in the e-mail list of the e-mail client.

9. The computer program product of claim 6, wherein the e-mail message handling operation for each of the e-mails in the related e-mail table related to the selected e-mail is one of a reply to the selected e-mail message, a forward of the selected e-mail message, and a return receipt requested for the selected e-mail message.

* * * * *